Figure 1:
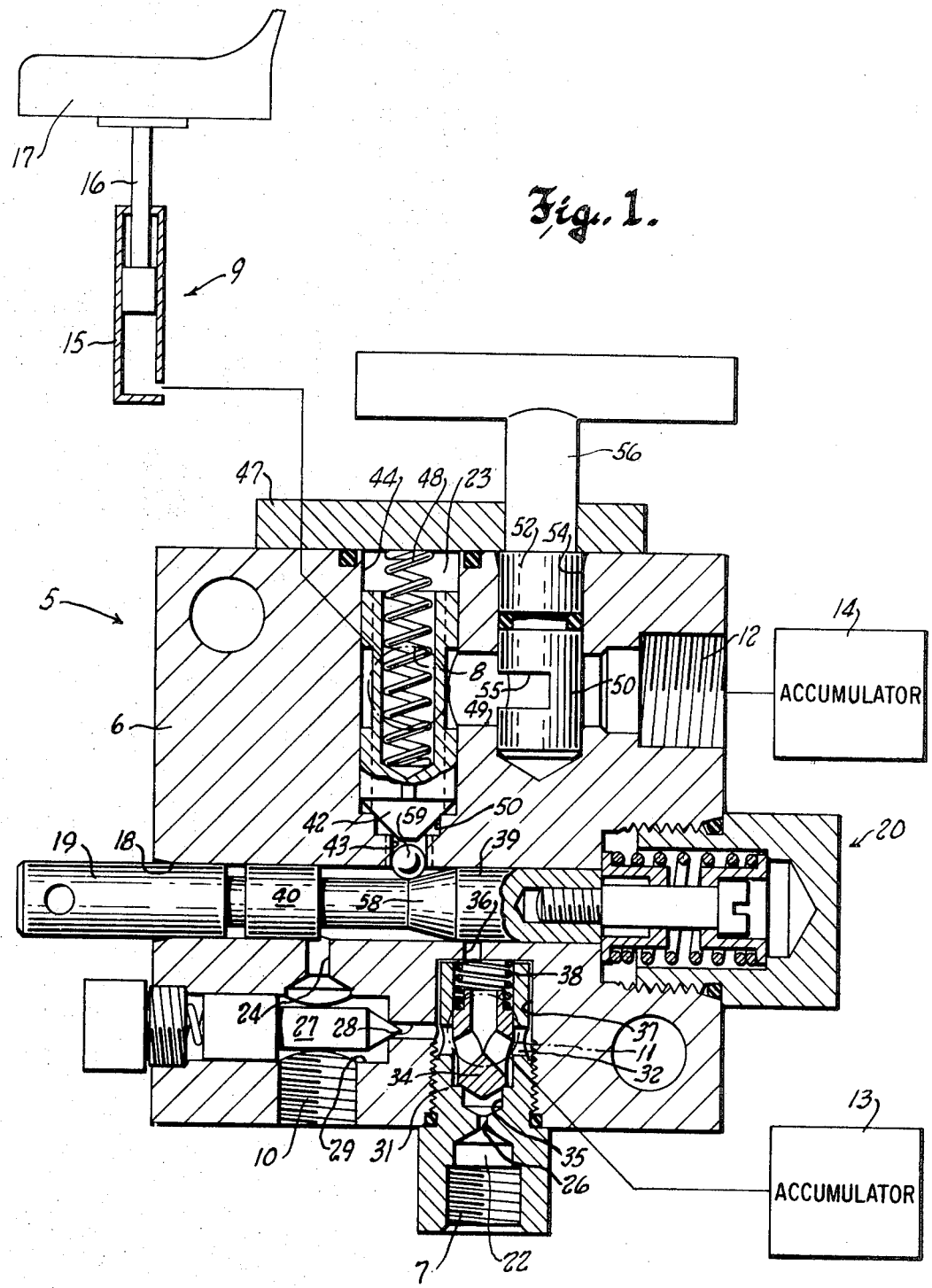

United States Patent

[11] 3,568,714

| [72] | Inventor | Verne P. Donner |
| | | Palatine, Ill. |
| [21] | Appl. No. | 750,896 |
| [22] | Filed | Aug. 7, 1968 |
| [45] | Patented | Mar. 9, 1971 |
| [73] | Assignee | Deltrol Corp. |
| | | Bellwood, Ill. |

[54] CONTROL APPARATUS FOR AUXILIARY HYDRAULIC SYSTEM
7 Claims, 2 Drawing Figs.

[52] U.S. Cl. .................................................. 137/596.12, 60/51
[51] Int. Cl. .................................................. F16k 11/10
[50] Field of Search .......................................... 137/596.12; 60/51

[56] References Cited
UNITED STATES PATENTS

| 2,241,545 | 5/1941 | Ernst | 137/596.12 |
| 2,363,235 | 11/1944 | Ellinwood | 137/596.12X |
| 2,392,471 | 1/1946 | Fox | 60/51 |
| 2,641,106 | 6/1953 | Jelinek | 60/51 |
| 2,893,355 | 7/1959 | Bauer | 137/596.12X |
| 3,171,254 | 3/1965 | Leduc | 60/51 |
| 3,208,220 | 9/1965 | Lechat | 60/51 |
| 3,216,448 | 11/1965 | Stacey | 137/596.2 |
| 3,430,444 | 3/1969 | Kamp | 60/51 |
| 3,125,120 | 3/1964 | Hasbany | 137/596.12 |

Primary Examiner—Henry T. Klinksiek
Attorney—Ira Milton Jones

ABSTRACT: A valve body has supply, service and exhaust passages leading to spaced zones of a bore in which a closed-center spool is slidable. There is a restriction near the inlet of the supply passage. An accumulator passage and a passage controlled by a relief valve communicate with the supply passage at a zone thereof between said restriction and the bore. Accumulator pressure is therefore lower than pressure in a main hydraulic system to which the supply passage is connected. A check valve in the supply passage, between said zone and the restriction, maintains accumulator pressure when the main system is unpressurized.

CONTROL APPARATUS FOR AUXILIARY HYDRAULIC SYSTEM

This invention relates to hydraulic control apparatus and has as its general object the provision of apparatus that is connectable with a high-pressure fluid source and by which the operation of a low-pressure hydraulic motor can be controlled, and which also provides for yielding resistance of the motor to varying load forces thereon.

By way of example, the apparatus of this invention can be installed on a tractor that is equipped with a high-pressure hydraulic system normally employed for control and actuation of various implements carried by the tractor. When so installed, the apparatus can provide for raising and lowering of the seat of the tractor so that the driver can readily adjust its height to suit his own convenience; and the apparatus can also provide for yielding resistance to up and down movement of the seat in response to variations of the load thereon such as are caused when the tractor travels over a bumpy surface.

Thus with respect to the specific example just cited, it is another object of this invention to provide apparatus connectable with the hydraulic system of a tractor or similar machine whereby a high degree of seating comfort can be afforded to the operator by enabling him to make heightwise adjustments of the seat with great facility, while also providing a yieldingly resilient support for the seat that affords good shock absorbing action as the machine travels over a bumpy surface.

Further with respect to the specific example just cited, it is another object of this invention to provide seat adjustment apparatus of the character described that can be operated when the hydraulic pressure source with which it is connected is inoperative, so that the operator of a machine on which is installed can employ it to adjust the height of his seat before he starts the engine of the machine, as well as when the machine is in operation.

In connection with this same example, it is also an object of this invention to provide apparatus of the character described that includes a manually adjustable control whereby the yielding resilience of the seat support can be adjusted to suit the weight of the operator and his preference for a harder or a softer ride.

It will be understood that it is also a general object of this invention to provide hydraulic control apparatus of the above-described character that is of general utility in a subsidiary hydraulic system which operates at relatively low pressure and which is intended to be connected with a higher pressure main hydraulic system to derive its hydraulic pressure fluid therefrom.

With these observations and objects in mind, the manner in which the invention achieves its purpose will be appreciated from the following description and the accompanying drawings. This disclosure is intended merely to exemplify the invention. The invention is not limited to the particular structure disclosed, and changes can be made therein which lie within the scope of the appended claims without departing from the invention.

Figure 2:
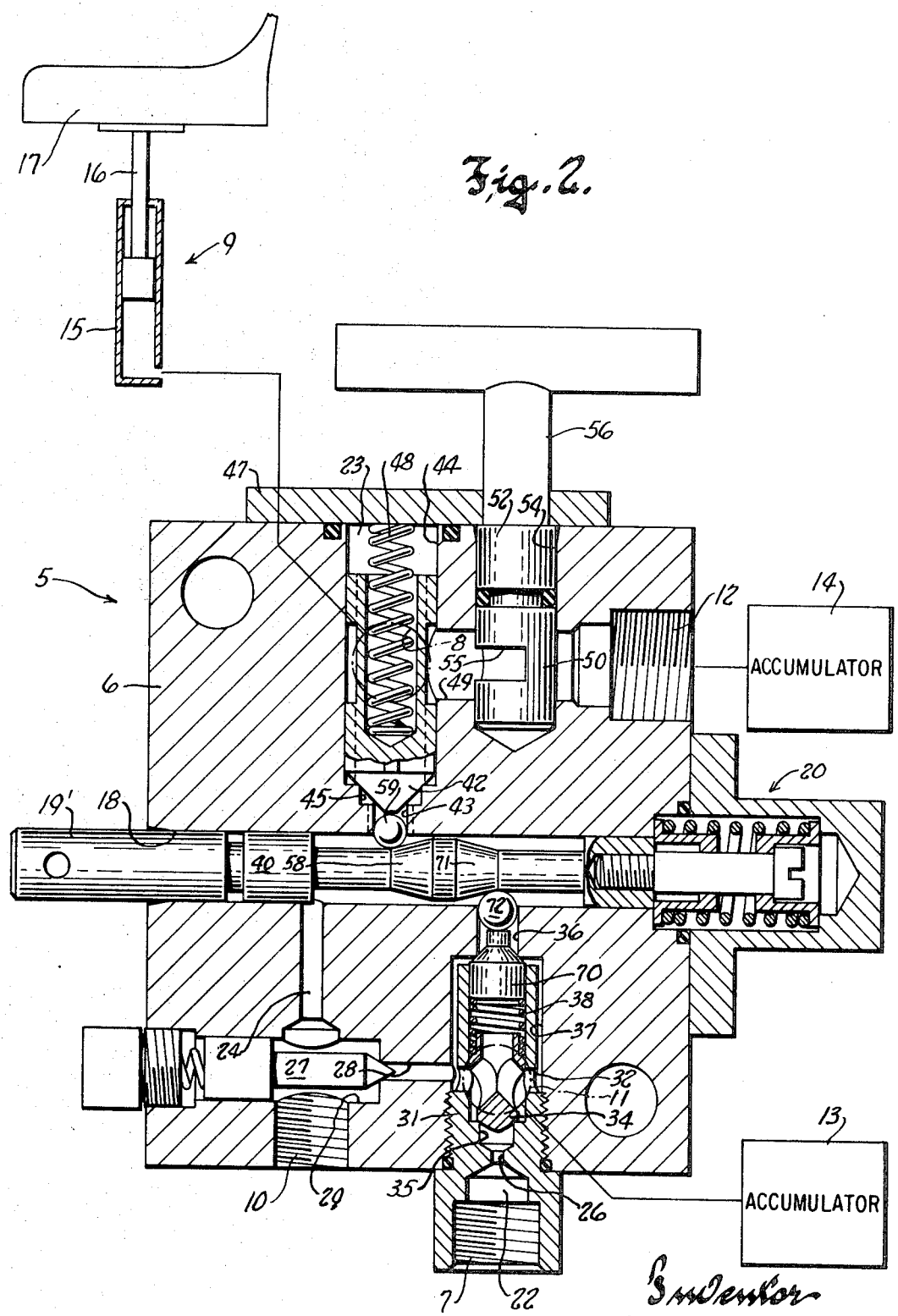

The drawings illustrate two complete examples of the physical embodiments of the invention constructed according to the best modes so far devised for the practical application of the principles thereof, and in which:

FIG. 1 is a sectional view of hydraulic control apparatus embodying the principles of this invention, illustrated in schematic relation to the apparatus with which it is intended to cooperate; and FIG. 2 is a similar view of a modified embodiment of the invention.

Referring now to the accompanying drawings, the numeral 5 designates generally the control apparatus of this invention, which comprises a valve body 6 having a supply port 7 at its bottom that is connectable with a source of high-pressure hydraulic fluid, a service port 8 at its rear that is connectable with a hydraulic motor 9, an exhaust port 10 at its bottom which can be connected with a fluid reservoir, a high-pressure accumulator port 11 at its rear that is connectable with a high-pressure accumulator 13, and a low-pressure accumulator port 12 at one of its sides that is connectable with a low-pressure accumulator 14.

The hydraulic motor 9 is in this case illustrated as being of the single-acting type, with a fixed, upright cylinder 15 and an upwardly projecting ram or piston 16 that supports an operator's seat 17 at its upper end.

In the valve body there is a bore 18 that opens to opposite sides of the body and in which a manually shiftable spool element 19 is slidable. The spool element is normally maintained in a neutral position (in which it is illustrated) by means of a more or less conventional centering spring mechanism 20.

When the operator desires to raise the seat 17, he moves the spool element 19 in one direction away from neutral (to the right as shown in the FIGS.), to thus provide for communication between a supply passage 22 that leads inwardly from the supply port 7 to the spool bore 18 and a service passage 23 that leads outwardly from the spool bore to the service port 8. Pressure fluid can then flow from the supply port 7 to the cylinder 15. When the operator wishes to lower the seat, he shifts the spool in the opposite direction from its neutral position, providing for communication between the service passage 23 and an exhaust passage 24 that extends outwardly from the spool bore to the exhaust port 10, thus permitting fluid to drain out of the cylinder so that the seat can descend under the influence of gravity. It will be understood that the spool 19 is provided with a suitable actuating lever or handle (not shown).

The amount of fluid that is transferred into or out of the cylinder 15 for seat adjustment is normally rather small, whereas the main hydraulic system with which the apparatus is intended to be connected operates with relatively high pressure. The apparatus therefore has means for effecting a substantial reduction in the pressure of the fluid flowing to the cylinder 15 from the supply port 7, comprising a throttling restriction 26 in the supply passage 22, near the outer end thereof, and a relief valve 27 which controls communication between the exhaust passage 24 and the portion of the supply passage 22 that is inward of the restriction 26.

The supply passage 22 and the exhaust passage 24 are parallel to one another, being transverse to the spool bore 18 and communicating therewith at zones spaced apart lengthwise thereof. A relief passage, parallel to the spool bore, is provided by a small bore 28 that opens to the supply passage and a counterbore 29 that transversely intersects the exhaust passage 24 and extends to one side face of the body. The relief valve mechanism 27, which can be of known type, can be threaded into the outer end of the counterbore 29, and the junction of the bore 28 and counterbore 29 provides a seat for the relief valve element that faces away from the supply passage.

The supply passage is defined, through a substantial part of its length, by a tubular member 31 which is threaded into a downwardly opening counterbore 37 in the body. The medial portion of the bore through the tubular member is of substantially reduced diameter to provide the throttling restriction 26, and inwardly of that restriction there are laterally opening ports 32 in the tubular member that provide for communication with the relief passage comprising the small bore 28, and with the high-pressure accumulator port 11, the latter of which comprises a bore that opens from the supply passage, inwardly of the restriction 26, and extends outwardly to one side face of the body.

The relief valve 27 of course prevents pressure of fluid in the inner portion of the supply passage from rising above a predetermined valve determined by the relief valve setting, while the restriction 26 permits only a small amount of fluid to flow through the relief valve so that very little fluid flows past the relief valve and therefore the apparatus of this invention does not materially affect the pressure maintained in the main hydraulic system with which it is connected.

When the main hydraulic system is operating, the high-pressure accumulator 13 is charged from it with fluid flowing into it from the supply passage by way of the high pressure accumulator port 11. When the main hydraulic system is shut down, flow of fluid from the accumulator 13 back into the supply port 7 is prevented by means of a check valve 34 in the supply passage, just inward of the restriction 26, and therefore pressure fluid from the high-pressure accumulator remains available to effect raising of the seat 17. The check valve 34 is slidable in the tubular member 31, in a large diameter inner bore portion thereof, and its seat is defined by the junction of that bore portion with an intermediate diameter bore portion 35 that opens from the restriction 26. Inward of the tubular member 31 the supply passage is defined by a small diameter bore 36 in the body that intersects the spool bore 18, and the shoulder defined by the junction of said bore 36 with the counterbore 37 in which the tubular member is received provides a seat for a compression spring 38 that reacts against the relief valve 34 to bias the latter onto its seat, in the direction toward the supply port 7. The check valve 34 is of course opened by pressure fluid flowing through the supply passage from the supply port.

When the spool 19 is in its neutral position, a land 39 on it closes the small diameter bore 36 to block flow of fluid out of the supply passage. When the spool is moved to its "raise" position (to the right, as shown in the drawings), the land 39 clears the service passage and another land 40 on the spool closes the inlet to the exhaust passage 24, constraining all fluid flowing from the supply passage to enter the service passage 23.

To prevent fluid from flowing out of the cylinder 15 to the exhaust passage 24 when the spool 19 is in neutral, there is a check valve 42 in the service passage. To accommodate this check valve, the service passage comprises a small bore 43 in the body that opens to the spool bore 18 intermediate its junctions with the supply and exhaust passages, and a counterbore 44 that opens to the top face of the body and opens at its inner end to an intermediate diameter bore portion 45 which in turn opens from the small diameter bore portion 43. The check valve 42 is slidable in the counterbore 44, and the junction of said counterbore with the intermediate diameter bore portion 45 provides the seat for the check valve.

The service port 8 comprises a bore in the body transverse to the spool bore and to the counterbore 44 and which opens from the latter intermediate its ends and extends outwardly to the rear face of the body. A plate 47 overlying the top face of the body closes the outer end of the counterbore 44 and provides a seat for a compression spring 48 that reacts against the check valve 42 to bias the same towards its closed position.

A low pressure accumulator passage is provided by another bore 49, transverse to the counterbore 44 and parallel to the spool bore 18, which leads from the service passage 23 to the low-pressure accumulator port 12. Varying loads on the hydraulic motor 9 cause back-and-forth flow of fluid between the cylinder and the low-pressure accumulator 14, to afford a resilient cushioning of the load forces. A manually adjustable throttling valve 50 in the low-pressure accumulator passage provides for regulation of the rate of such back-and-forth fluid flow to control the degree of cushioning that it effects. The throttling valve comprises a spindle 52, rotatable in a bore 54 which extends parallel to the counterbore 44, intersects the low-pressure pressure accumulator passage and opens the top face of the body. The spindle 52 has a transverse notch 55 in line with the low-pressure accumulator passage and has a shaft portion 56 which projects above the top of the valve body through a hole in the plate 47, to be accessible for adjusting manipulation.

When the spool 19 is shifted to its "raise" position, in which it communicates the supply passage 22 with the service passage 23 (to the right, as shown), pressure of fluid from the supply passage forces the check valve 42 off of its seat. However, when the spool is shifted in the opposite direction out of neutral, the check valve must be mechanically unseated to permit fluid to flow from the service passage to the exhaust passage 24. To this end the spool is provided with a frustoconical cam surface 58 which engages a driver 59 when the spool is moved out of its neutral position and towards its "lower" position. The driver 59, which is illustrated as a ball, comprises cam follower means cooperating with the cam surface 58 and with the check valve 42 to translate motion of the spool in its "lower" direction into motion of the check valve off of its seat.

The driver 59 has an easy fit in the small diameter bore portion 43 of the service passage, and there are axially extending grooves in the surface of said bore that permit fluid to flow around the driver.

The valve apparatus of the modified embodiment of the invention illustrated in FIG. 2 is similar in all respects to that described above except that there is a second check valve 70 in its supply passage 22, which opens outwardly, and the land 39 on its spool 19' is replaced by a second frustoconical cam surface 71 that cooperates with a driver 72 to unseat the check valve 70 when the spool is shifted toward its "raise" position. The maximum diameter of the cam surfaces 58 and 71 is substantially smaller than that of the spool bore 18 so that the cam surfaces do not interfere with flow of fluid past them. The check valve 70 is received in the counterbore in the tubular member 31, inwardly of its outlet to the high-pressure accumulator port 11, and the seat for said check valve is provided by the junction of the body bore 37 in which the tubular member is received with the small diameter bore portion 36 in the body that defines the inner end portion of the supply passage. In this case the compression spring 38 that biases the check valve 34 outwardly reacts against the check valve 70 so that it also serves to bias the latter inwardly towards its seat.

The check valve 70, in cooperation with the check valve 34, serves to prevent discharge of the high-pressure accumulator if the main hydraulic system is inoperative for an extended period of time. Such discharge might occur with the unit illustrated in FIG. 1 if there were slow leakage past the land 39 on the spool. Hence the embodiment of the invention illustrated in FIG. 2, while sightly more expensive than that of FIG. 1, places less exacting demands upon accuracy in machining of the spool.

It will be observed that machining of the body of the valve of this invention is relatively simple and inexpensive, inasmuch as most of the passages in it can have their axes disposed in a single plane parallel to the front and rear faces of the body, there being only two outlets to the rear of the body.

From the foregoing description taken with the accompanying drawings it will be apparent that this invention provides control apparatus for a low-pressure auxiliary hydraulic system which is connectable with a high-pressure main hydraulic system and whereby the operation of a low-pressure hydraulic motor can be controlled while at the same time providing for yielding resistance of the motor to varying loads thereon.

I claim:

1. A control valve for connection with a main hydraulic system operated at high fluid pressure, for controlling a cylinder in an auxiliary system which operates at substantially lower pressure, characterized by the combination of:

A. a valve body having a bore and having supply, service and exhaust passages that lead to different zones of the bore, the service passage leading to a service port that is connectable with the cylinder;

B. a valve element movable in the bore to first and second operating positions to alternatively communicate the service passage with either the supply passage or the exhaust passage through the bore, said valve element having a closed center position at which it blocks such flow through the bore;

C. a first supply port for the supply passage connectable with the source of high-pressure fluid for the main hydraulic system;

D. a second supply port for the supply passage connectable with an accumulator so that the latter can be charged by fluid from the first supply port; and E. means for maintaining accumulator pressure at said second supply port at a predetermined value which is less than the normal pressure valve of fluid at said first supply port, but at a value sufficient to operate the cylinder in the absence of pressure at the first supply port, said last named means comprising:
1. a restricted passage through which high-pressure fluid from the first supply port must flow to reach the supply passage;
2. a check valve to block return flow of fluid from the second to the first supply port; and
3. a relief valve controlled exhaust passage connecting with the supply passage.

2. The control valve of claim 1, further characterized by:
F. a third port connecting with the service passage and connectable with a second accumulator to at all times provide for transfer of fluid between the second accumulator and said cylinder.

3. The control valve of claim 2, further characterized by:
G. a check valve in the service passage at a location between the bore and said third port, to block fluid flow to the bore from both the service port and said third port; and
H. means operated by the valve element for unseating said check valve in consequence of movement of the valve element to its second operating position.

4. The control valve of claim 3, further characterized by:
I. another check valve, in the supply passage, normally blocking flow therefrom to the bore; and
J. means operated by the valve element for unseating said other check valve in consequence of movement of the valve element to said first operating position thereof.

5. Apparatus for effecting raising and lowering of a hydraulic cinder, such as that by which the height of a tractor seat is adjusted, and for yieldingly resisting motion of the cylinder in response to varying loads thereon, said apparatus comprising:
A. a valve body having in it a bore for a valve spool, and supply, service and exhaust passages opening from the bore at spaced intervals therealong, the service passage having an outlet connectable with a hydraulic cylinder and the supply passage having an inlet connectable with a source of fluid under high pressure;
B. a spool axially shiftable in said bore between a normal closed-center position preventing communication among said passages and a pair of operative positions, in one of which the service passage is communicated through the bore with the supply passage and in the other of which it is communicated through the bore with the exhaust passage;
C. means in the inlet portion of the supply passage providing a restriction by which the pressure of fluid flowing into the supply passage is substantially reduced;
D. a relief passage opening from the supply passage at a zone thereof between said restriction and the spool bore;
E. a relief valve governing flow through said relief passage, for limiting the pressure of fluid in the supply passage at times when the spool is in its closed-centered position;
F. a first accumulator passage connectable with an accumulator and communicating with said zone of the supply passage;
G. a check valve in the supply passage between said zone thereof and the restriction, for maintaining pressure in the first accumulator passage when the fluid at the inlet of the supply passage has no pressure, but permitting flow of fluid from the inlet to the accumulator passage and toward the bore; and
H. a second accumulator passage connectable with another accumulator and at all times in communication with the outlet of the service passage to provide for transfer of fluid between said other accumulator and the hydraulic cylinder.

6. The control valve of claim 1, further characterized by a manually adjustable throttling valve in said second accumulator passage.

7. The control valve of claim 6 further characterized by:
A. The service passage comprising a bore which opens to one side of the body;
B. the second accumulator passage comprising a bore transverse to said service passage bore and opening to another side of the body; and
C. the throttling valve being rotatable in a bore which is transverse to the second accumulator passage and intersects the same, and having an end portion projecting outside the body to be accessible for manual adjustment.